United States Patent [19]

Eguchi et al.

[11] Patent Number: 4,714,332
[45] Date of Patent: Dec. 22, 1987

[54] FILM DATA READING DEVICE

[75] Inventors: Masaharu Eguchi; Yoichi Tosaka; Ichiro Ohnuki, all of Tokyo; Yoshihiko Aihara; Akira Ishizaki, both of Kanagawa, all of Japan

[73] Assignee: Canon Kabushiki Kaisha, Tokyo, Japan

[21] Appl. No.: 783,847

[22] Filed: Oct. 3, 1985

[30] Foreign Application Priority Data

Oct. 8, 1984 [JP] Japan .................. 59-209827
Dec. 24, 1984 [JP] Japan .................. 59-272543

[51] Int. Cl.⁴ .............................................. G03B 7/24
[52] U.S. Cl. ............................................... 354/21
[58] Field of Search ................... 354/21, 289.1; 352/78 C

[56] References Cited

U.S. PATENT DOCUMENTS

4,200,371 4/1980 Suzuki et al. ............... 354/21

Primary Examiner—W. B. Perkey
Attorney, Agent, or Firm—Toren, McGeady & Associates

[57] ABSTRACT

A film data reading device is provided with contacts for reading a data relative to a film from a data code part provided on a film cartridge. The contacts are arranged to be protrusible into and retractable from a cartridge loading chamber and to be retracted from the cartridge chamber when loading the chamber with the film cartridge.

9 Claims, 22 Drawing Figures

FILM DATA READING DEVICE

BACKGROUND OF THE INVENTION

1. Field of the Invention:

This invention relates to a film data reading device for a camera.

Figure 1:
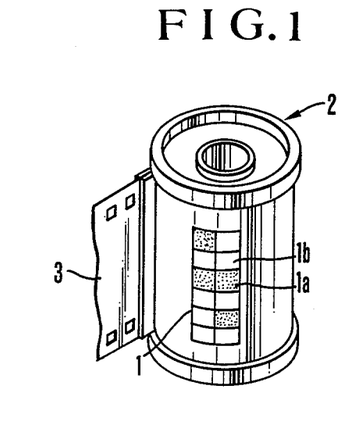
FIG. 1 is an oblique view showing a typical example of a film cartridge of the kind having film information provided thereon.
Figure 2:
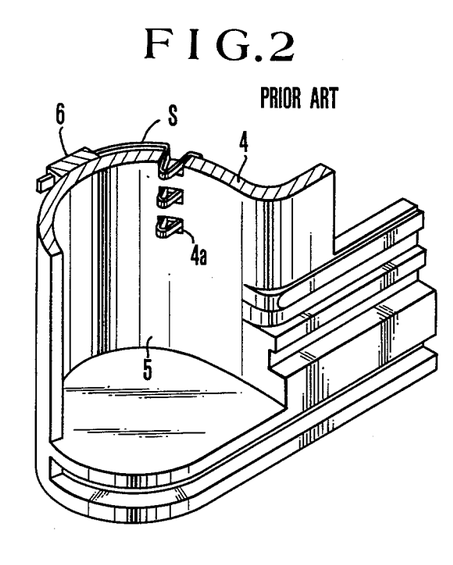
FIG. 2 is an oblique view showing the conventional film data reading device.
Figure 3:
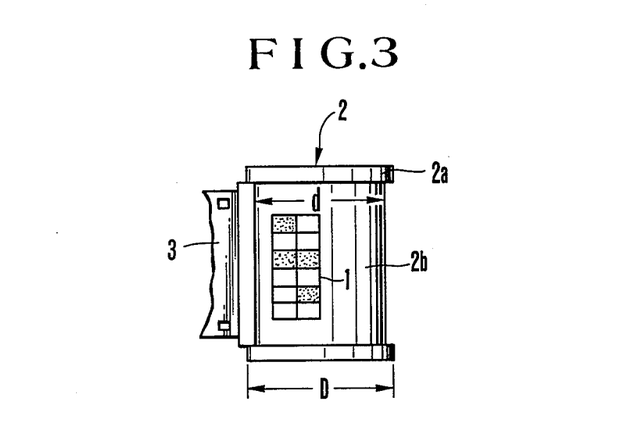
FIG. 3 shows the diametric dimensions of the varied parts of the same cartridge.

2. Description of the Prior Art:

There has been proposed during recent years a film cartridge 2 which is provided, on the peripheral surface thereof, with a film data code part 1 indicative of the sensitivity or the number of frames of the film contained in the cartridge, as shown in FIG. 1 of the accompanying drawings. The film data code part 1 consists of an electric conductive part 1a and a non-conductive part 1b. These parts are combined into varied patterns which indicate the information on the film. For reading the film data or information from the cartridge 2, a plurality of contact pieces are arranged on the side of a camera to come into contact with the data code part 1 of the film cartridge 2, and the electric conductive state of the data code part 1 is detected. FIG. 2 shows an example of this reading arrangement. In this case, holes 4a are formed in the frame wall 4 of the camera body in positions corresponding to the data code part 1 of the cartridge 2. Contact pieces S are arranged to protrude thrugh the holes 4a into a cartidge (loading) chamber 5. When the chamber 5 is loaded with the cartridge 2, the film data provided on the cartridge 2, is read out by means of these contact pieces S. One end of each contact piece S is inserted into a holding member 6 which is secured to the frame 4 of the camera body. Further, there are two different types of the cartridge 2. In one type, the diameter d of the middle cylindrical part 2b having the data code part 1 is arranged to be smaller than the diameter D of each of the cap parts 2a of the cartridge (D >d). In the other type, the diameter d is arranged to be about equal to the diameter D (D ≈d).

In the case of the reading device of the prior art described, the position of the cartridge 2 within the cartridge chamber 5 is determined by the diameter D, which is standardized. Whereas the dimension of the other diameter d has not been clearly standardized. In view of this, the protruding extent of the contact pieces S into the cartridge chamber 5 has been arranged to be sufficient for absorbing variations in the diameter d. Therefore, in the event of a camera which is incapable of retracting a film rewinding fork from the cartridge chamber 5, the cartridge 2 must be inserted into the cartridge chamber 5 in a scooping manner by tilting it. In that case, the contact pieces S are apt to be deformed or damaged while the data code part 1 is also apt to be damaged. Furthermore, the excessive protruding extent of the contact pieces S tends to cause them to catch the cap part 2a of the cartridge to deteriorate the operability of the camera. Even in the case of a camera which is arranged to have the film rewinding fork retractable from the cartridge chamber 5, inadvertent insertion of the cartridge into the cartridge chamber in a tilted posture by the operator or inadvertent contact of a finger of the operator with the contact pieces S likewise tends to deform or damage the contact pieces S.

Figure 4:
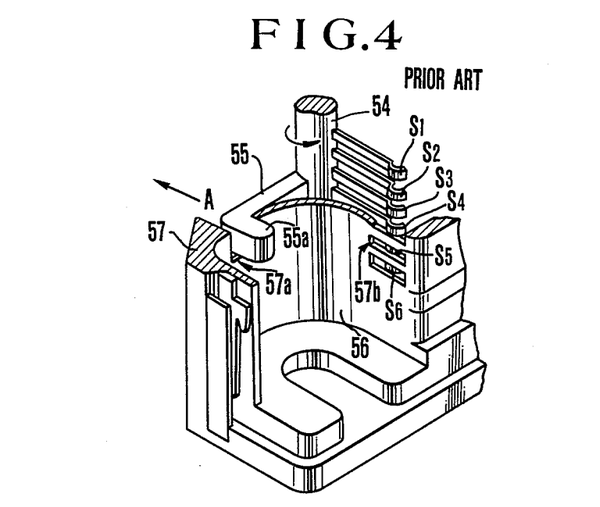
FIG. 4 is an oblique view showing a prior art improvement over the conventional film data reading device.

To solve this problem, an improvement on the conventional film data reading device has been disclosed in Japanese Laid-Open Patent Application No. Sho 57-202524. According to that disclosed device, which is as shown in FIG. 4, a rotatable shaft 54 is constantly urged to turn counterclockwise by a spring which is not shown; a sensor lever 55 and contact pieces S1 to S6 are secured to the shaft 54; the contact pieces S1 to S6 are allowed to protrude into a cartridge chamber 56 when the sensor lever 55 senses that the chamber 56 is loaded with a film cartridge 2; and the film data is read out via these contact pieces. When the chamber 56 is not loaded with the cartridge 2, the sensing part 55a of the sensor lever 55 is left protrudent inside the cartridge chamber 56 through a hole 57a provided in the body frame 57 of a camera since the shaft 54 is under the counterclockwise urging force of the spring which is not shown. When the chamber 56 is loaded with cartridge 2, a front peripheral part of the cartridge 2 pushes the sensing part 55a in the direction of arrow A. This causes the shaft 54 to rotate clockwise against the urging force of the spring. Then, while the sensing part 55a is pushed out of the chamber 56, the contact pieces S1 to S6, which have stayed away from the inside of the cartridge chamber 56, protrude into the cartridge chamber 56 and thus come into contact with a film data code part 1 provided on the outside of the cartridge 2, so that the film data can be read out.

In accordance with the arrangement of the device disclosed, however, the cartridge loading force is utilized for obtaining a pushing force on the contact pieces S1 to S6. This arrangement necessitates an exertion of an unnecessary force in loading the chamber with the cartridge. This has thus been a hindrance to cartridge loading operation. Furthermore, even after the cartridge 2 has been placed in the chamber 56, the cartridge 2 is still receiving a force exerted in a direction in which it is to be taken out. This force drives the cartridge 2 out of the cartridge chamber 56 to a slight degree. Then, if the back lid of the camera is closed with the cartridge 2 in that incompletely loaded state, the film is apt to curl under that condition. Then, the curl either turns round the cartridge to cause inaccurate engagement of the tip of the film with a film guide groove or keeps the film in a twisted state. Therefore, the prior art device has been unsuited for a camera of the automatic film loading kind.

SUMMARY OF THE INVENTION

It is a general object of this invention to provide a film data reading device which is arranged to prevent contact pieces and a data code part from being damaged and ensures a smooth film loading operation.

The above and further objects and features of this invention will become apparent from the following detailed description of preferred embodiments thereof taken in connection with the accompanying drawings.

DETAILED DESCRIPTION OF THE PREFERRED EMBODIMENTS

Figure 5:
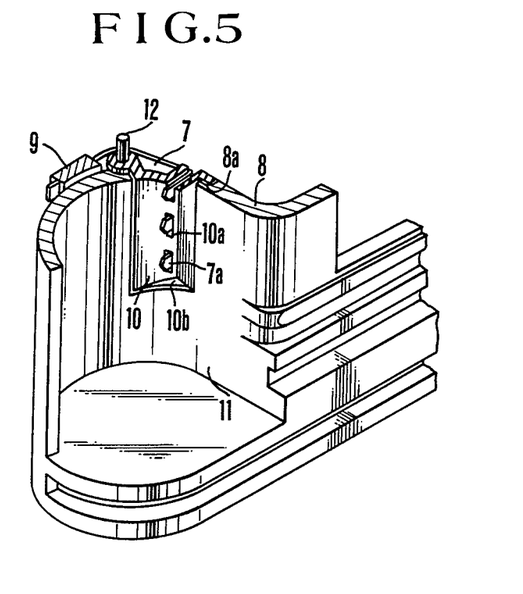
FIG. 5 is an oblique view showing a first embodiment of this invention.
Figure 6A:
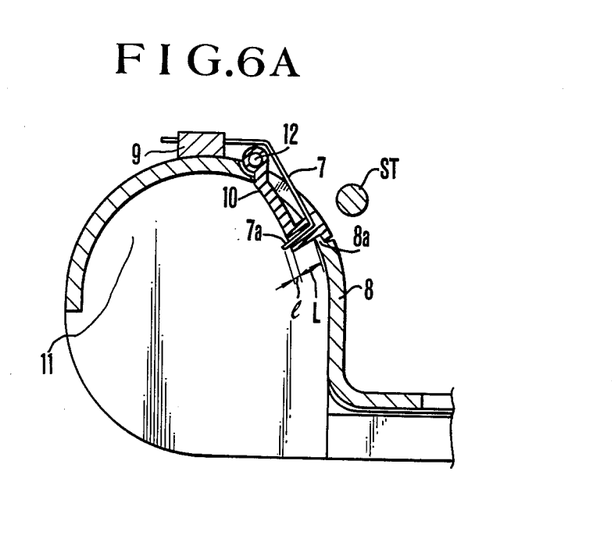
FIGS. 6A and 6B are cross-sectional views of the embodiment shown in FIG. 5.
Figure 6B:
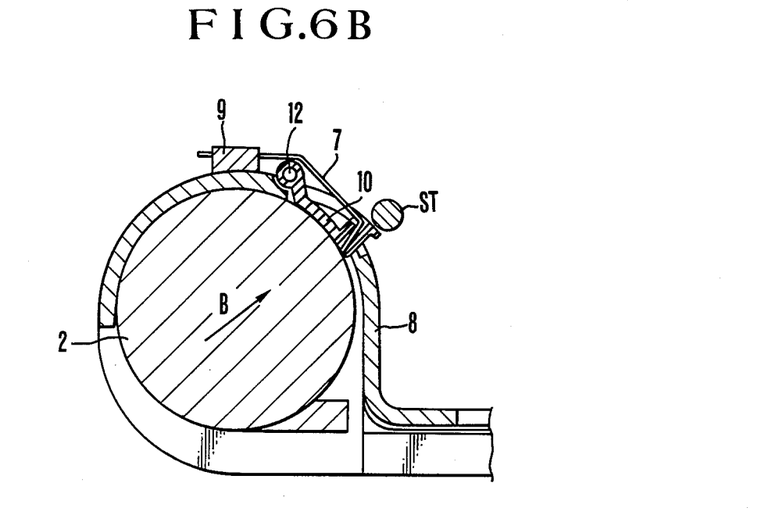

The following describes in detail preferred embodiments of this invention with reference to the accompanying drawings:

FIGS. 5, 6A and 6B show a first embodiment. Contact pieces 7 are attached by insert molding to a carrying member 9 which is secured to a frame wall 8 of a camera body. The cartridge abutting parts 7a of these contact pieces 7 are arranged to be protrusible into and retractable from a film cartridge (loading) chamber 11 via holes 10a of a protection member 10 which is made of an insulating material. The protection member 10 is turnable on a shaft 12. The protrusible extent L into the cartridge chamber 11 of the protection member 10 is limited by a limiting part 8a. The protrusible extent L (see FIG. 6A) is set at a suitable value for coping with all variations in the diameter d of the middle cylindrical parts of different film cartridges. The protrusible extent l (see FIG. 6A) of the contact pieces 7 (or their cartridge abutting parts 7a) from the holes 10a of the protection member 10 is set at such a value that: The positional variations of the cartridge 2 due to tilting thereof that might take place when the cartridge is put into the cartridge chamber 11 can be duly absorbed to ensure adequate abutting of the contact pieces on the data code part 1 of the cartridge 2 without having these contact pieces 7 excessively protrudent into the cartridge chamber 11. The protection member 10 is provided with tapered parts 10b at the upper and lower ends thereof. The tapered ends 10b prevent the cartridge from being caught by the protection member 10 when the cartridge is inserted into and removed from the cartridge chamber 11. There is provided a stopper ST for limiting the extent of a counterclockwise turn of the protection member 10.

The protection member 10 is urged to move clockwise by the pre-tension of the contact pieces 7. With the cartridge 2 not loaded, therefore, the protection member 10 is protrudent into the cartridge chamber 11 to the protruding extent L as shown in FIG. 6A. Under this normal condition, the contact pieces 7 are protrudent to an extent l via the holes 10a of the protection member 10. When the cartridge 2 is inserted into the cartridge chamber 11 with the protection member 10 and the contact pieces 7 cartridge (the abutting parts 7a of the contact pieces 7) protruding in this manner, the member 10 and the pieces 7 are pushed by the outside surface of the cartridge 2. This causes them to move counterclockwise to their positions as shown in FIG. 6B. The cartridge 2 is then stably kept in place under a pushing force of a pushing part of the back lid of the camera which is not shown with the pushing force exerted in the direction of arrow B. Under this condition, the protruding extent l of the contact pieces 7 is zero. However, since they remain in a freely movable state within a remaining extent of the counterclockwise stroke of the protection member 10 before the member 10 abuts on the stopper 14, they are kept, without fail, in contact with the data code part 1 of the cartridge 2. To prevent an excessive play of the protection member 10 in this instance, a spring of a moderate force may be arranged to exert an unexcessive urging force in the clockwise direction on the protection member 10. The contact pieces 7 somewhat move round within the holes 10a. Therefore, to ensure a smooth operation, these contact pieces 7 are preferably arranged to move round coaxially with the shaft 12 as much as possible.

In the case of the prior art example given in the foregoing with reference to FIG. 2, the variations or unevenness of the outside diameters of cartridges and the play of the cartridge in its loaded position are arranged to be absorbed solely by virtue of the protruding extent of the contact pieces S. Whereas, as apparent from FIGS. 5, 6A and 6B, the embodiment is arranged to absorb such unevenness and play jointly by the protruding extent L of the protection member 10 and that of the contact pieces 7. Even if the cartridge 2 or a finger of the operator is inadvertently brought into contact with the contact pieces 7, the contact is made only with the protruding extent l of the contact pieces and thus they would remain undamaged or undeformed.

Figure 7:
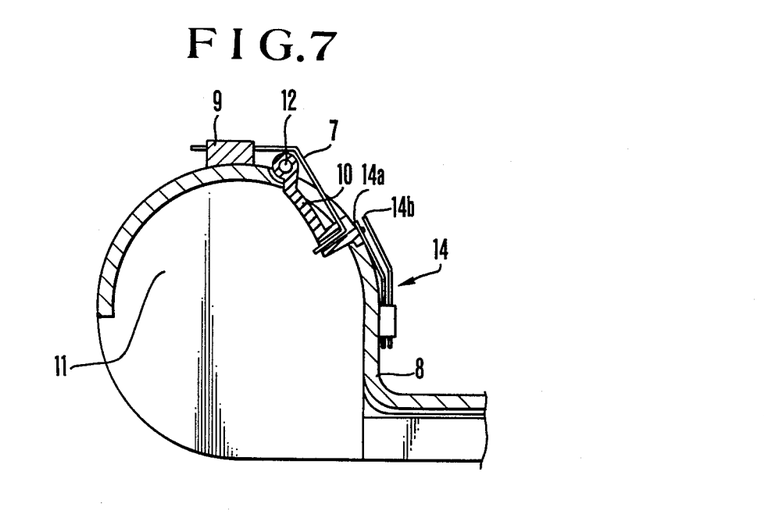
FIG. 7 is a cross-sectional view of a second embodiment of this invention.

FIG. 7 shows a second embodiment of the invention in which a cartridge detection switch 14 is arranged in addition to the arrangement of the first embodiment shown in FIGS. 5, 6A and 6B. The cartridge detection switch 14 is arranged to detect the presence or absence of the cartridge 2 and to generate a detection signal. The detection signal thus produced is used for causing an external display device of the camera to make a display as to the presence of the cartridge 2 or for determining an operating condition of the camera. The switch 14 operates in this manner even in the case of a cartridge having no film data code part. In addition to this function, the cartridge detection switch 14 is also used for discriminating a cartridge having the data code part from a cartridge having no data code part. In the event of the cartridge of the latter type, the switch 14 serves to prompt setting of a film sensitivity value, a number of frames of the film or a certain range of latitude or to make a warning display indicating that the cartridge has no data code part provided thereon. In the case of embodiment shown in FIG. 7, the turning force of the protection member 10, which turns when the cartridge is loaded, is used for pushing one of the contact pieces 14a of the cartridge detection switch 14 into contact with the other contact piece 14b. This brings the switch 14 into an electrical conductive state for detecting the cartridge loading. With the protection member 10 arranged to perform a cartridge detecting function in this manner in addition to the function of protecting the contact pieces 7, this embodiment obviates the necessity of arranging an addition protrudent member within the cartridge chamber 11 for the purpose of detecting a cartridge loading operation.

Figure 8A:
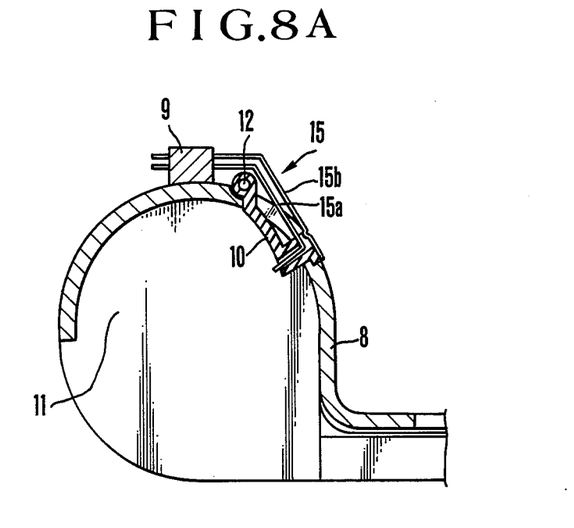
FIGS. 8A and 8B are cross-sectional view of a third embodiment.
Figure 8B:
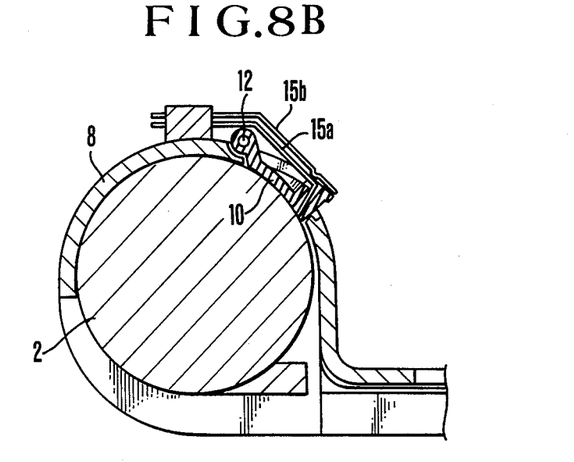

FIGS. 8A and 8B show a third embodiment of the invention. In this embodiment, contact pieces 15a and 15b which constitute a cartridge detection switch 15 are attached to a carrying member 9 by insert molding. The contact piece 15a is arranged to be brought into contact with the other contact piece 15b when the cartridge chamber 11 is loaded with a cartridge as shown in FIG. 8B, so that cartridge loading can be automatically detected by the switch 15. The switch 15 remains off when the cartridge chamber is not loaded with any cartridge as shown in FIG. 8A. The contact piece 15a is arranged in exactly the same manner as the contact pieces 7 which are not shown in FIGS. 8A and 8B and is disposed in the lowest place among the contact pieces in alignment with the contact pieces 7, for example. Meanwhile, the other contact piece 15b of the switch 15 is arranged to serve also as a spring to urge the protection member 10 to move clockwise.

Figure 9A:
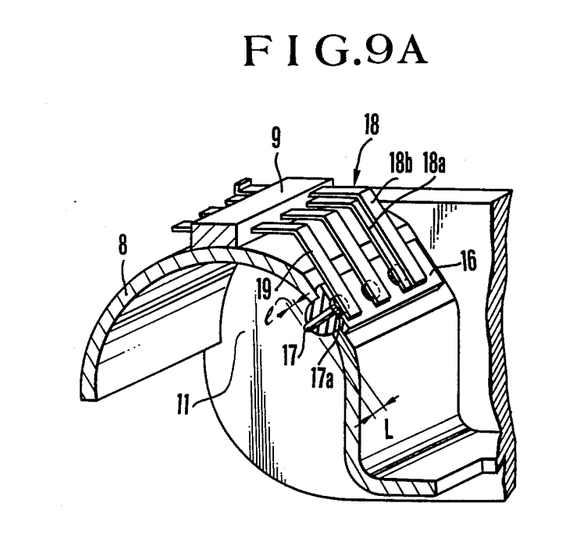
FIGS. 9A and 9B are oblique views of a fourth embodiment.
Figure 9B:
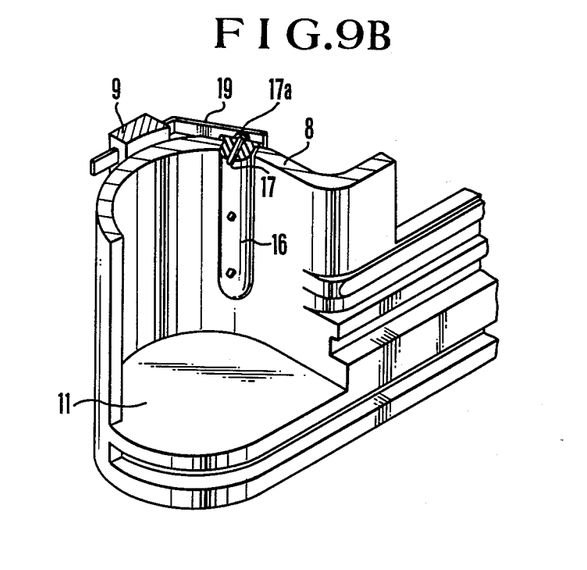

FIGS. 9A and 9B show a fourth embodiment of this invention. In this embodiment, a protection member 16 is arranged to fittingly carry a number of contact pins 17 required for data reading in such a way as to be portrusible or retractable into and from the cartridge chamber 11. The protection member 16 is also arranged to be protrusible and retractable into and from the cartridge chamber 11 through the body frame wall 8. Each of the contact pins 17 is provided with a head part 17a which is arranged to prevent the pin from pulling out of protection member 16. A cartridge detection switch 18 consists of contact pieces 18a and 18b which are attached to a carrying member 9 by insert molding in the same manner as contact spring pieces 19 which are arranged to carry the contact pins 17. The fourth embodiment differs from the first embodiment which is shown in FIGS. 5, 6A and 6B in the following point: The head parts 17a of the contact pins 17 are constantly pushed by the contact spring piece 19 to have the pins 17 kept in a conductive state being thus protruded into the cartridge chamber 11. The protruding extent of the protection member 16 and that of the contact pins 17 are respectively set at the values L and l as mentioned in the foregoing and as shown in FIG. 9A when the cartridge chamber 11 is not loaded with a cartridge 2. Therefore, the contact pins 17 (or contact means) likewise can be effectively prevented from being deformed or damaged in loading the chamber with a cartridge 2.

Figure 10A:
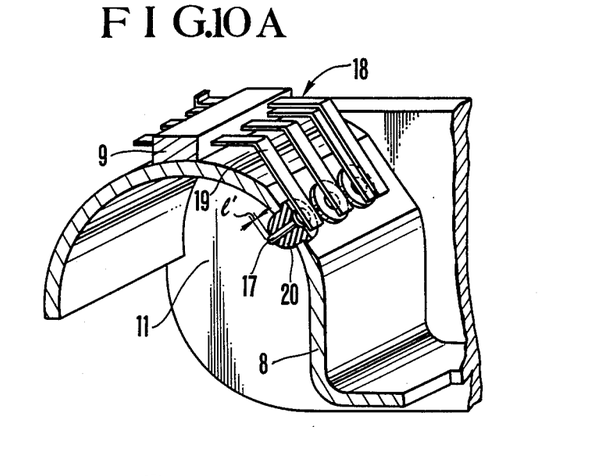
FIGS. 10A and 10B are oblique views of a fifth embodiment.
Figure 10B:
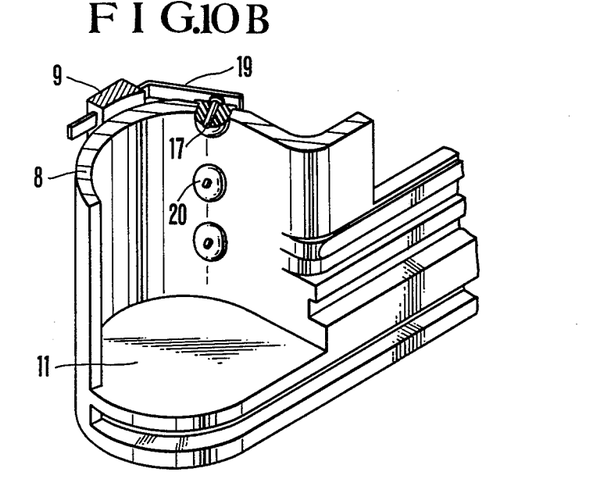

FIGS. 10A and 10B show a fifth embodiment of this invention. In this case, the contact pins 17 of the preceding embodiment shown in FIGS. 9A and 9B are fittingly carried by a plurality of protection members 20. These protection members 20 carry these pins 17 to be individually protrusible into and retractable from the cartridge chamber 11 through the body frame wall 8. The contact pins 17 are arranged in a number required for data reading. Since the protection members 20 are arranged separately from each other, each of the contact pins 17 is protrusible into and retractable from the cartridge chamber independently of each other even though they are respectively formed in one body with one of the protection members 20. Therefore, in loading a cartridge, variations, etc. can be absorbed by this arrangement. The arrangement, therefore, permits setting the protruding extent l of the contact pins 17 of FIGS. 9A and 9B at a smaller value l'. Further, if the protection members 20 are arranged to loosely fit into the body frame wall 8, each of the contact spring pieces 19 can be unified with each corresponding contact pin 17 by spot welding. Further, the contact pins 17 may be omitted by bending the fore ends of the contact spring pieces 19 and by replacing the contact pins 17 with the bent tips of the spring pieces with the protection members 20 arranged in one unified body directly with these fore ends, respectively.

Figure 11A:
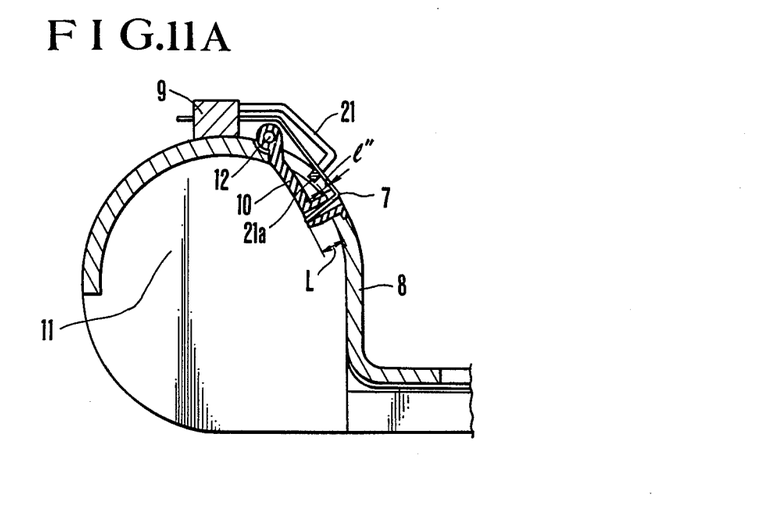
FIGS. 11A and 11B are cross-sectional views of a sixth embodiment.
Figure 11B:
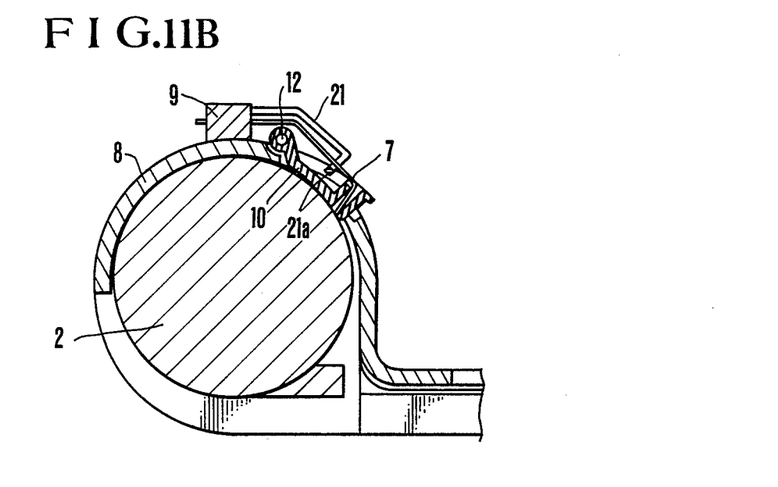

FIGS. 11A and 11B show a sixth embodiment of this invention. This embodiment differs from the embodiment shown in FIGS. 5, 6A and 6B in the following point: Lock members 21 are formed in one unified body with the carrying member 9.

Each of the lock members 21 is provided with an uprising part 21a. The uprising part 21a is arranged to restrict the movable extent of the corresponding contact piece 7 to a distance l" in such a manner that the protruding extent of the contact pieces 7 into the cartridge chamber 11 becomes zero (l = 0) as shown in FIG. 11A. With the embodiment arranged in this manner, the contact pieces 7 never protrude within the cartridge chamber 11 when the chamber 11 is not loaded with any cartridge. Therefore, the contact pieces can never be deformed nor damaged. In loading the chamber 11 with a cartridge 2, as shown in FIG. 11B, the protection member 10 moves counterclockwise to bring the contact pieces 7 into contact with the data code part of the cartridge. Therefore, the data relative to the film can be read out via the contact pieces 7. The protection member 10 is constantly under a clockwise urging force of a spring which is not shown. The protruding extent of the contact pieces 7 remains zero (l = 0) even during the process of cartridge loading.

Figure 12:
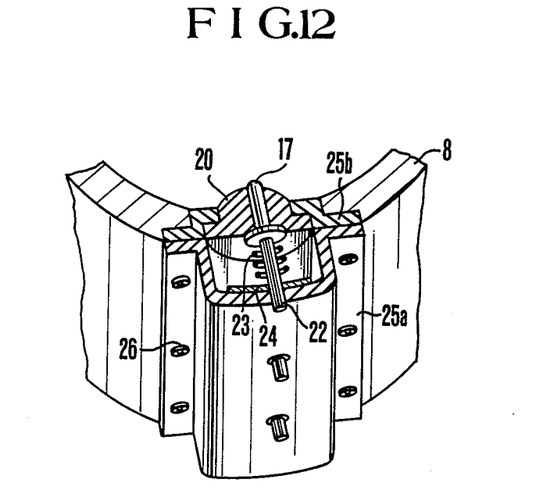
FIG. 12 is an oblique view of a seventh embodiment of the invention.

In the first to sixth embodiments described, the protection members 10, 16 and 20 are arranged to be protrudent into the cartridge chamber 11 by means of the contact pieces 7, the contact spring pieces 19, etc. Whereas, a seventh embodiment of this invention is arranged, as shown in FIG. 12, to have the protection member 20 thrust forth into the cartridge chamber 11 by an urging force of a coiled spring 23 fitted on a conductive pin 22 which is formed in one body with each contact pin 17 in the rear of the latter. This arrangement not only permits effective use of limited available space, but also permits complete unitization of these parts for mass production and prevention of dust, etc. Referring further to FIG. 12, the illustration includes a printed circuit board 24 which is arranged to transmit signals from the conductive pins to an applicable part of the camera; casing members 25a and 25b made of an insulating material; and screws 26.

In each of the first to seventh embodiments described in the foregoing, the protruding extent of the readng means nsto the cartridge chamber 11 is restricted by the protection means which is protrusible and retractable into and from the cartridge chamber 11 in the same manner as the contact means. In other words, when the cartridge chamber 11 is not loaded with a film cartridge, the protruding position of the protection means within the chamber 11 is arranged to be at a point not more than a predetermined distance (protruding extent l) behind that of the contact means, so that the contact means can be prevented from being deformed or damaged. Further, since the apparent protruding extent into the cartridge chamber 11 is either very short or zero, the arrangement gives no disagreeable feeling to the operator. Besides, since the protection means is of a structure similar to the contact means and is disposed in the same place as the latter, the arrangement is advantageous in terms of space.

Another advantage of these embodiments resides in that the protection means is made of an insulating material and, therefore, enables the invented device to be applied to a camera of the kind having its body frame used as the ground level, or made of a metal, such as a single-lens reflex camera. Further, the operation of the protection means or contact means can be utilized for on-off control over the cartridge detection switch. This obviates the necessity of arranging an additional switch within the cartridge chamber 11 for that purpose. It is a further advantage of these embodiments that the upper and lower ends of the protection means are tapered to ensure smooth cartridge loading.

Figure 13:
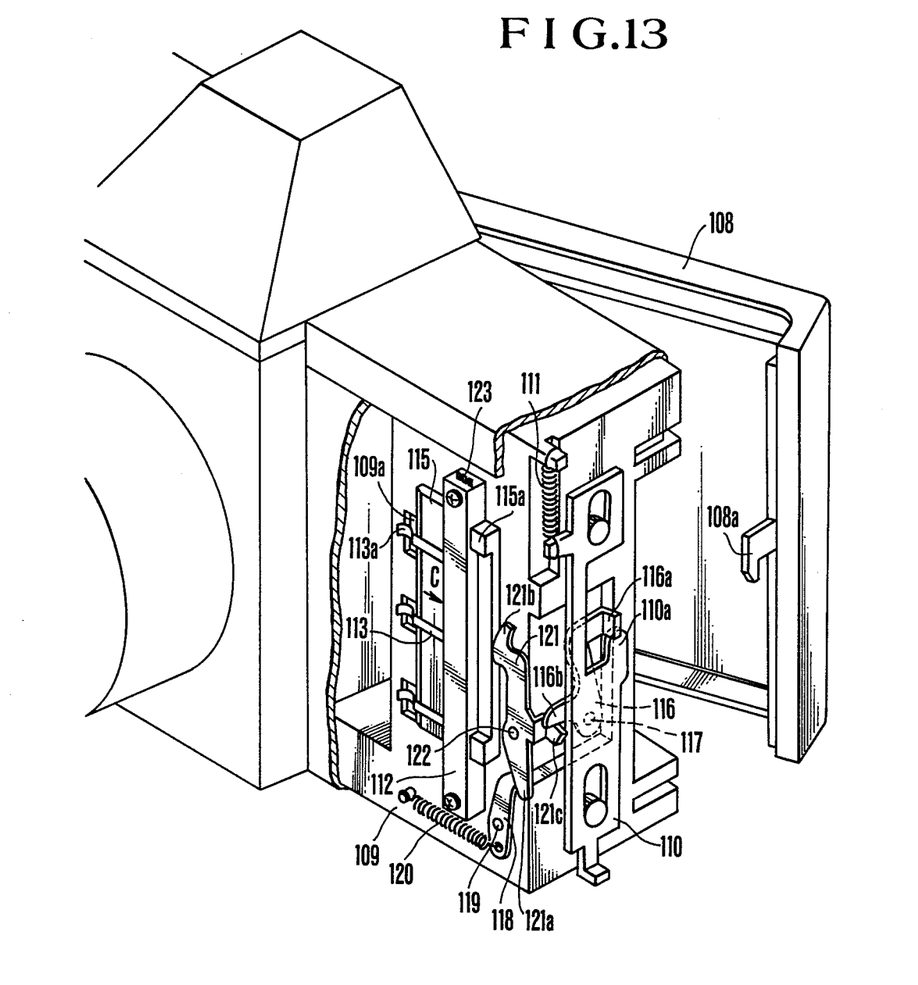
FIG. 13 is an oblique view of an eighth embodiment of the invention.
Figure 14:
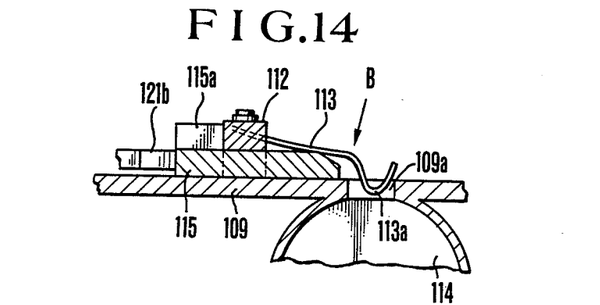
FIGS. 14 to 16 are illustrations of the operation of the eighth embodiment.
Figure 15:
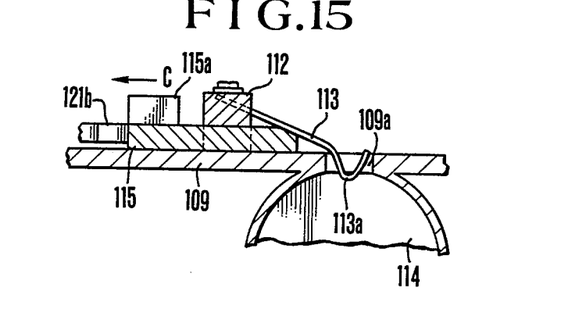
Figure 16:
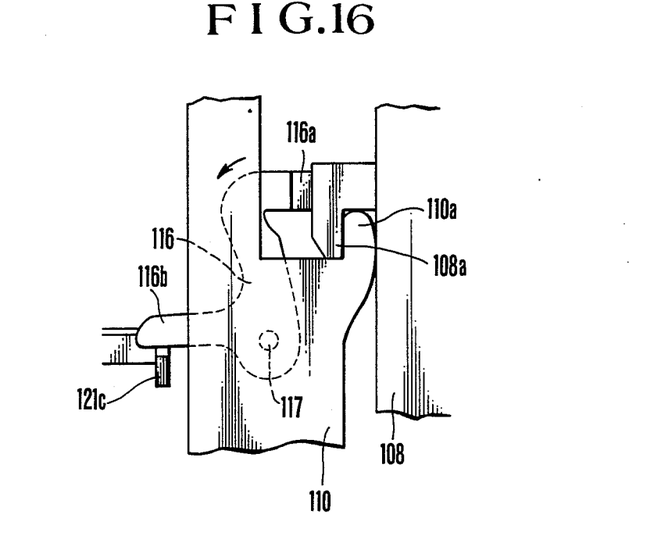

FIGS. 13 to 16 show an eighth embodiment of this invention. These illustrations include a back lid 108 which is provided with a lock pawl 108a for engagement with a claw part 110a of a lock lever 110; a camera body frame 109; the lock lever 110 which is provided with the claw part 110a and is constantly pulled upward by a spring 111, which forms a back lid locking device in conjunction with the lever 110; and a contact unit 112. Referring to FIGS. 14 and 15, the contact unit 112 consists of contact pieces 113 which are formed by insert molding. The contact pieces 113 are arranged to be protrusible into and retractable from a cartridge chamber 113 through holes 109a. The holes 109a are formed in the body frame 109 in positions corresponding to the data code part of a cartridge which is not shown. A contact piece extracting member 115 is slidably inserted in between the contact unit 112 and the body frame 109 and is pushed by the contact pieces 113 in the direction of arrow C as shown in FIGS. 13 and 15. The member 115 is provided with a stopper part 115a which is arranged to restrict the movement of the contact piece retracting member 115 in the direction reverse to the direction of arrow C to an arbitrary point as shown in FIG. 14. A transmission lever 116 is provided with a raised part 116a and a transmission part 116b. When the back lid 108 of the camera is closed, the lock pawl 108a of the back lid 108 pushes the raised part 116a to the left as viewed on FIG. 13. This causes the transmission lever 116 to turn counterclockwise on a shaft 117 as shown in FIG. 16. An urging lever 118, turnable on a shaft 119, is constantly under a clockwise turning force exerted by the returning force of a contact piece retracting spring 120. The turning force of this urging lever 118 urges the contact piece retracting member 115 to move in the direction reverse to the direction of arrow C via an intermediate lever 121. By this urging force, the bent parts 113a of the contact pieces 113 are retracted away from the cartridge chamber 114, that is, from the state of FIG. 15 to a state as shown in FIG. 14. The above-stated intermediate lever 121 is turnable on a shaft 112 and is provided with end parts 121a, 121b and a raised part 121c. When the raised part 121c is in a state of being pushed downward by the transmission lever 116, i.e. when the back lid 108 is closed, the clockwise turn of the intermediate lever 121 against the urging force of the urging lever 118 causes the retracting member 115 to be moved in the direction of arrow C by the pressure of the contact pieces 113 (as shown in FIG. 15). It goes without saying that the returning force (or pulling force) of the contact piece retracting spring 120 is greater than the pressure of the contact pieces 113. A terminal 123 is arranged to supply a film data read out by the contact pieces 113 to an applicable circuit such as an exposure control circuit which is not shown.

When the back lid 108 is opened, the embodiment operates as follows: With the back lid opened, the pushing force of the transmission lever 116 is removed. The intermediate lever 121 is allowed to make a counterclockwise turn according to the urging force of the urging lever 118. The contact piece retracting member 115 is under a leftward urging force of the end part 121b of the intermediate lever 121, (in the direction reverse to the direction of arrow C) as shown in FIG. 13. The member 115 is thus moved by this force along a rectangluar hole formed between the contact unit 112 and the body frame 109 until the stopper part 115a of the member 115 comes to abut on the side face of the contact unit 112 as shown in FIG. 14. This raises the contact pieces 113 upward as shown in FIG. 14. The bent parts 113a of these contact pieces 113 are thus moved away from the cartridge chamber 114. A cartridge is inserted into and taken out from the cartridge chamber under that condition.

With the cartridge chamber loaded with a cartridge, when the back lid 108 of the camera is closed, the lock pawl 108a of the back lid 108 pushes the claw part 110a of the lock lever 110 downward to come into an engaged position by thus riding over the claw part 110a. Then, the lock pawl 108a pushes the raised part 116a of the transmission lever 116 to cause the lever 116 to turn clockwise on the shaft 117. The transmission part 116b of the cover 116 then pushes down the raised part 121c of the intermediate lever 121. The intermediate lever 121 turns clockwise on the shaft 122 against the urging force of the urging lever 118. The clockwise turn of the intermediate lever 121 releases the contact piece retracting member 115 from the urging force of the end part 121b of the intermediate lever 121. As a result, the member 115 is pushed by the contact pieces 113 in the direction of arrow C as shown in FIG. 15. The bent parts 113a of the contact pieces 113 then enters the cartridge chamber 114 via the hole parts 109a formed in the body frame 109 to come into contact with the film data code part of the cartridge. The contact pieces 113 then read a code signal corresponding to information on the film contained in the cartridge. The signal thus read is produced from the terminal 123.

In this example, the contact pieces 113 are arranged to come to protrude into the cartridge chamber 114 only when the back lid 108 is closed by utilizing the lock pawl 108a of the back lid 108. This arrangement dispenses with a detection lever. Therefore, a cartridge loading operation can be smoothly carried out without exerting any unnecessary large force. Further, since there is nothing on the side wall of the cartridge chamber 114 that hinders the entrance of the cartridge, the cartridge loading operation can be accurately carried out to reduce, to a great degree, the possibility of various problems that result from curling or the like of the film. The embodiment thus permits automatic film loading in a satisfactory manner, so that this invention can be applied to an automatic film loading type camera.

Since the contact pieces 113 are allowed to protrude into the cartridge chamber 114 only when the back lid 108 is closed, the contact pieces 113 are never deformed nor damaged and the film data code part is never damaged even in cases where the cartridge has to be inserted in a tilted state as a film rewinding fork of the camera is not arranged to be retractable from the cartridge chamber. Besides, the contact pieces 113 are effectively prevented from being deformed or soiled by the inadvertent contact of a finger of the operator with them.

Figure 17:
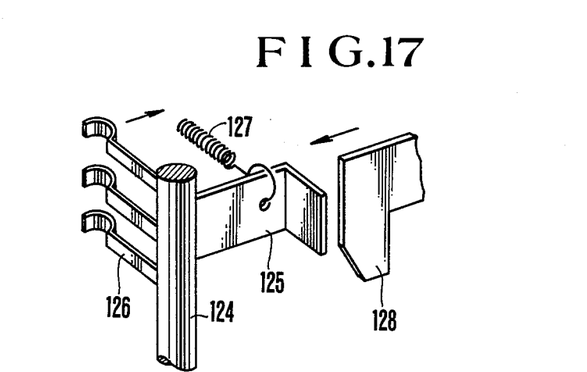
FIG. 17 is an oblique view of the essential parts of a ninth embodiment of the invention.

In the case of this specific embodiment, the arrangement to allow the contact pieces 113 to protrude into the cartridge chamber only when the back lid 108 is closed includes the transmission lever 116, the intermediate lever 121, the contact unit 112, the contact piece retracting member 115, the urging lever 119, the contact piece retracting spring 120, etc. In accordance with this invention, however, this arrangement can be made in a different manner. FIG. 17 shows such a different arrangement as a ninth embodiment of this invention.

Referring to FIG. 17, the ninth embodiment is arranged as follows: A transmission lever 125 and contact pieces 126 are secured to a shaft 124. The contact pieces 126 are arranged to be constantly under a counterclockwise urging force of spring 127 urging them to move in that direction on the shaft 124. The illustration includes a lock pawl 128.

Further, the closing movement of the back lid 108 is arranged to be transmitted by means of the lock pawl 108a in the case of the eighth embodiment. However, the back lid 108 may be provided with a different protrudent member in lieu of the lock pawl 108a. In that instance, the protrudent member of course may be disposed to the transmission lever. In another possible modification of the embodiment described, the lock pawl 108a or the above-stated protrudent member can be omitted by arranging the transmission lever to be long enough to be pushed by the inner side (on the side of the cartridge chamber) of the In a further possible modification of the embodiment, the length of the contact piece retracting member 115 is arranged to be longer on the side of the holes 109a in such a way as to have the holes 109a covered when the contact pieces are retracted, thereby providing a dust proof effect. It is of course necessary to have an additional spring arranged to urge the contact piece retracting member 115 to move in the direction of arrow C.

The contact pieces 113 which are employed as reading means may be replaced with some suitable magnetic or optical reading means.

The film data reading device, according to this invention, as described in the foregoing, prevents the contact means for reading a data on the film and the film data code part provided on a film cartridge, from being damaged by a film cartridge loading operation on the cartridge chamber, and yet ensures smooth film loading.

What is claimed is:

1. A film data reading device, comprising:
    (a) contact means arranged to read a film data by coming into contact with a data code part formed on a film cartridge, said contact means being arranged to be freely protrusible into and retractable from a cartridge loading chamber; and
    (b) protecting means arranged to encompass at least a portion of said contact means, said protecting means being arranged also to be freely protrusible into and retractable from said cartridge loading chamber, wherein said contact means is arranged to be not protruding from said protecting means toward the inside of said cartridge loading chamber when said chamber is not loaded with a film cartridge.

2. A film data reading device, comprising:
    (a) contact means arranged to read a film data by coming into contact with a data code part formed on a film cartridge, said contact means being arranged to be freely protrusible into and retractable from a cartridge loading chamber;
    (b) protecting means arranged to encompass at least a portion of said contact means, said protecting means being arranged also to be freely protrusible into and retractable from said cartridge loading chamber; and
    (c) detecting means for detecting loading of a film cartridge, said detecting means being arranged to detect the movement of said contact means and that of said protecting means when said chamber is loaded with a film cartridge.

3. A device according to claim 2, wherein said detecting means includes contact members.

4. A film data reading device, comprising:
    (a) contact means arranged to read a film data by coming into contact with a data code part formed on a film cartridge, said contact means being arranged to be freely protrusible into and retractable from a cartridge loading chamber;
    (b) protecting means arranged to encompass at least a portion of said contact means, said protecting means being arranged also to be freely protrusible into and retractable from said cartridge loading chamber; and
    (c) detecting means for detecting loading of a film cartridge, said detecting means being arranged to detect the movement of said contact means when said chamber is loaded with a film cartridge.

5. A device according to claim 4, wherein said detecting means includes contact members.

6. A film data reading device, comprising:
    (a) contact means arranged to read a film data by coming into contact with a data code part formed on a film cartridge, said contact means being arranged to be freely protrusible into and retractable from a cartridge loading chamber;
    (b) protecting means arranged to encompass at least a portion of said contact means, said protecting means being arranged also to be freely protrusible into and retractable from said cartridge loading chamber; and
    (c) detecting means for detecting cartridge loading, said detecting means being arranged to detect the movement of said protecting means when said cartridge loading chamber is loaded with a film cartridge.

7. A device according to claim 6, wherein said detecting means includes contact members.

8. A film data reading device, comprising:
    (a) contact means arranged to read a film data by coming into contact with a data code part which is formed on a film cartridge; and
    (b) detecting means for detecting cartridge loading, said detecting means being arranged to be freely protrusible into and retractable from a film cartridge loading chamber and being provided with a contact protecting part disposed in the neighborhood of the contact part of said contact means which is arranged to come into contact with said data code part, said detecting means further being arranged to detect the movement of said contact means when said chamber is loaded with a film cartridge.

9. A film data reading device, comprising:
    (a) contact means arranged to read a film data by coming into contact with a data code part formed on a film cartridge, said contact means being arranged to be freely protrusible into and retractable fro a cartridge loading chamber, said contact means being formed with an elastic member and being provided with a contact part which is arranged to come into contact with said data code part of a film cartridge, said contact means being elastically urged to move toward the inside of said cartridge loading chamber;

(b) protecting means arranged to encompass at least a portion of said contact means, said protecting means being arranged also to be freely protrusible into and retractable from said cartridge loading chamber, said protecting means being pivotably supported at one end, an amount of protrusion into said cartridge loading chamber of said protecting means being smaller toward said pivotably supported one end and larger toward another end thereof, and surrounding said contact means near said another end; and (c) urging means for elastically urging said protecting means to move toward the inside of said cartridge loading chamber.

* * * * *